US011472689B1

(12) United States Patent
Posner et al.

(10) Patent No.: US 11,472,689 B1
(45) Date of Patent: Oct. 18, 2022

(54) DISTRIBUTED BEVERAGE DEVELOPMENT AND IMPROVEMENT PLATFORM

(71) Applicant: Cana Technology, Inc., Redwood City, CA (US)

(72) Inventors: Nicholas D. Posner, Redwood City, CA (US); Yashodhan Deshpande, Sunnyvale, CA (US); Gregory Allen Springer, Los Altos, CA (US)

(73) Assignee: Cana Technology, Inc., Redwood City, CA (US)

( * ) Notice: Subject to any disclaimer, the term of this patent is extended or adjusted under 35 U.S.C. 154(b) by 0 days.

(21) Appl. No.: 17/552,267

(22) Filed: Dec. 15, 2021

(51) Int. Cl.
*B67D 1/00* (2006.01)
*B67D 1/08* (2006.01)

(52) U.S. Cl.
CPC ......... *B67D 1/0041* (2013.01); *B67D 1/0034* (2013.01); *B67D 1/0888* (2013.01); *B67D 2210/00089* (2013.01)

(58) Field of Classification Search
CPC .. B67D 1/0041; B67D 1/0034; B67D 1/0888; B67D 2210/00089; G07F 13/065; G07F 9/002; G07F 9/001; G05B 17/02
USPC ............................................................ 222/1
See application file for complete search history.

(56) References Cited

U.S. PATENT DOCUMENTS

| | | |
|---|---|---|
| 6,375,043 B1 | 4/2002 | LeBlanc |
| 8,788,090 B2 | 7/2014 | Rothschild |
| 9,334,150 B1 | 5/2016 | Ost et al. |
| 9,679,329 B2 | 6/2017 | Jones |
| 10,087,063 B2 | 10/2018 | Zimmerman et al. |
| 2012/0035761 A1 | 2/2012 | Tilton et al. |
| 2012/0046785 A1 | 2/2012 | Deo et al. |
| 2012/0123588 A1 | 5/2012 | Cloran et al. |
| 2014/0196811 A1 | 7/2014 | Ramos et al. |
| 2015/0170533 A1* | 6/2015 | Hayashi ............. G09B 19/0092 434/127 |
| 2016/0090288 A1 | 3/2016 | Givens, Jr. et al. |
| 2016/0257554 A1 | 9/2016 | Manwani et al. |

(Continued)

FOREIGN PATENT DOCUMENTS

| | | |
|---|---|---|
| AU | 2011292361 A1 | 3/2013 |
| GB | 2583546 A | 11/2020 |

(Continued)

*Primary Examiner* — Vishal Pancholi
*Assistant Examiner* — Robert K Nichols, II
(74) *Attorney, Agent, or Firm* — Daylight Law, P.C.

(57) ABSTRACT

Systems and methods for developing a recipe using a network of beverage synthesis devices are disclosed. A disclosed method includes transmitting, from a network architecture, the recipe to at least two beverage synthesis devices in the network of beverage synthesis devices. The recipe is compatible with the network of beverage synthesis devices for synthesis into a beverage. The method further includes receiving, at the network architecture, information from the at least two beverage synthesis devices. The method further includes modifying, subsequent to receiving of the information and using the network architecture, the recipe to produce a modified recipe. The method further includes transmitting, from the network architecture, the modified recipe to the network of beverage synthesis devices. The modified recipe is compatible with the network of beverage synthesis devices for synthesis into a modified beverage.

24 Claims, 5 Drawing Sheets

(56) References Cited

U.S. PATENT DOCUMENTS

| | | | |
|---|---|---|---|
| 2016/0325980 A1* | 11/2016 | Sawhney | B67D 1/1284 |
| 2017/0076266 A1 | 3/2017 | Salvucci et al. | |
| 2017/0119200 A1 | 5/2017 | Bressi | |
| 2017/0172340 A1 | 6/2017 | Baarman et al. | |
| 2019/0146641 A1 | 5/2019 | Deo et al. | |
| 2019/0164237 A1* | 5/2019 | Newman | G06Q 50/12 |
| 2020/0255277 A1 | 8/2020 | Stubbs et al. | |

FOREIGN PATENT DOCUMENTS

| | | |
|---|---|---|
| JP | 2021065348 A | 4/2021 |
| WO | 2020163281 A1 | 8/2020 |

* cited by examiner

| Device No. | Average Consumption | Recipe A Consumption |
|---|---|---|
| Device 1A | 10 Pours in 30 days | 12 Pours in 30 days |
| Device 2A | 12 Pours in 30 days | 15 Pours in 30 days |
| Device 3A | 0 Pours in 30 days | 0 Pours in 30 days |
| Device 4A | 20 Pours in 30 days | 18 Pours in 30 days |
| (...) | ... | ... |
| Device nA | 3 Pours in 30 days | 10 Pours in 30 days |

502

| Device No. | Average Consumption | Recipe B Consumption |
|---|---|---|
| Device 1B | 10 Pours in 30 days | 10 Pours in 30 days |
| Device 2B | 13 Pours in 30 days | 10 Pours in 30 days |
| Device 3B | 1 Pours in 30 days | 0 Pours in 30 days |
| Device 4B | 18 Pours in 30 days | 18 Pours in 30 days |
| (...) | ... | ... |
| Device nB | 2 Pours in 30 days | 3 Pours in 30 days |

503

| Device No. | Average Consumption | Recipe A Consumption |
|---|---|---|
| Device 1A | 10 Pours in 30 days | 8 Pours in 30 days |
| Device 2A | 12 Pours in 30 days | 10 Pours in 30 days |
| Device 3A | 0 Pours in 30 days | 1 Pours in 30 days |
| Device 4A | 20 Pours in 30 days | 15 Pours in 30 days |
| (...) | ... | ... |
| Device nA | 3 Pours in 30 days | 10 Pours in 30 days |

504

| Device No. | Average Consumption | Recipe B Consumption |
|---|---|---|
| Device 1B | 2 Pours in 30 days | 10 Pours in 30 days |
| Device 2B | 7 Pours in 30 days | 13 Pours in 30 days |
| Device 3B | 1 Pours in 30 days | 5 Pours in 30 days |
| Device 4B | 18 Pours in 30 days | 20 Pours in 30 days |
| (...) | ... | ... |
| Device nB | 5 Pours in 30 days | 8 Pours in 30 days |

DISTRIBUTED BEVERAGE DEVELOPMENT AND IMPROVEMENT PLATFORM

BACKGROUND

Beverage dispensing devices dispense beverages for users. Basic beverage dispensers passively store a premixed beverage which is dispensed out of a reservoir when needed. More sophisticated devices are adapted to create a beverage on demand using a set of base ingredients. For example, a set of concentrated syrups and carbonated water in a soda fountain serve to create a plurality of drinks on demand by mixing the syrup with the carbonated water. Certain beverage dispensers include a library of beverages from which a user can select a desired drink. Certain beverage dispensing additionally allow a user to customize stored recipes, such as by controlling an amount of sugar, adding or removing ingredients, adjusting the temperature of the beverage to be dispensed, and the like.

SUMMARY

This disclosure relates generally to beverage synthesis devices and methods, and more specifically, to a distributed beverage development and improvement platform using a network of beverage synthesis devices and a network architecture.

The beverage development and improvement platform of specific embodiments of the invention uses a network of any number of beverage synthesis devices. The beverage synthesis devices can be devices configured to synthesize a beverage based on a compatible recipe. The recipe can be selected by a user of the device, for example from an available library of recipes. The beverage synthesis devices can be configured to exchange information with a network architecture associated with the platform. In specific embodiments of the invention, the devices in the network of devices can access recipes from the network architecture for synthesis into a beverage.

In specific embodiment of the invention, the network architecture is configured to receive information from the devices in the network of devices. The information can include usage information regarding the synthesis of a beverage by the devices in the network. The network architecture can be configured to take actions based on the information received from the network of devices. For example, the network architecture can use the information to modify or improve a recipe. The modified or improved recipes could then be transmitted back to the device for further iterations of observation and improvement of the recipes. The network architecture could, in this manner, be used to modify and improve a default recipe on the device or be used to test and develop entirely new beverage recipes. The recipes could be modified or improved at the individual user level based on their personal consumption patterns or at the level of various geographical areas or demographic populations based on a statistical analysis of the consumption patterns of a large number of users.

In specific embodiments of the invention, a method for developing a recipe using a network of beverage synthesis devices is provided. The method comprises transmitting, from a network architecture, the recipe to at least two beverage synthesis devices in the network of beverage synthesis devices. The recipe is compatible with the network of beverage synthesis devices for synthesis into a beverage. The method further comprises receiving, at the network architecture, information from the at least two beverage synthesis devices. The method further comprises modifying, subsequent to the receiving of the information, the recipe to produce a modified recipe. The method further comprises transmitting, from the network architecture, the modified recipe to the network of beverage synthesis devices. The modified recipe is compatible with the network of beverage synthesis devices for synthesis into a modified beverage.

In specific embodiments of the invention, a network architecture for developing a recipe using a network of beverage synthesis devices is provided. The network architecture comprises at least one server, a communication module, and a recipe engine instantiated in the at least one server. The network architecture is configured to transmit, using the communication module, the recipe to at least two beverage synthesis devices in the network of beverage synthesis devices. The recipe is compatible with the network of beverage synthesis devices for synthesis into a beverage. The network architecture is further configured to receive, using the communication module, information from the at least two beverage synthesis devices. The network architecture is configured to modify, using the recipe engine and subsequent to receiving the information, the recipe to produce a modified recipe. The network architecture is configured to transmit, using the communication module, the modified recipe to the network of beverage synthesis devices. The modified recipe is compatible with the network of beverage synthesis devices for synthesis into a modified beverage.

In specific embodiments of the invention, a platform for developing a recipe is provided. The platform comprises a network architecture and a network of beverage synthesis devices. The platform comprises means for transmitting, from the network architecture, the recipe to at least two beverage synthesis devices in a network of beverage synthesis devices, wherein the recipe is compatible with the network of beverage synthesis devices for synthesis into a beverage. The platform comprises means for receiving, at the network architecture, information from the at least two beverage synthesis devices. The platform comprises means for modifying, subsequent to receiving of the information, the recipe to produce a modified recipe. The platform comprises means for transmitting, from the network architecture, the modified recipe to the network of beverage synthesis devices, wherein the modified recipe is compatible with the network of beverage synthesis devices for synthesis into a modified beverage.

BRIEF DESCRIPTION OF THE DRAWINGS

FIG. 5 illustrates a set of tables with exemplary data used by the distributed beverage development and improvement platform, in accordance with specific embodiments disclosed herein.

In the Figures, like reference numbers correspond to like components unless otherwise stated.

DETAILED DESCRIPTION

Reference will now be made in detail to implementations and embodiments of various aspects and variations of systems and methods described herein. Although several exemplary variations of the systems and methods are described herein, other variations of the systems and methods may include aspects of the systems and methods described herein combined in any suitable manner having combinations of all or some of the aspects described.

Different components and methods for a fluid mixture dispensing device will be described in detail in this disclosure. The methods and systems disclosed in this section are nonlimiting embodiments of the invention, are provided for explanatory purposes only, and should not be used to constrict the full scope of the invention. It is to be understood that the disclosed embodiments may or may not overlap with each other. Thus, part of one embodiment, or specific embodiments thereof, may or may not fall within the ambit of another, or specific embodiments thereof, and vice versa. Different embodiments from different aspects may be combined or practiced separately. Many different combinations and sub-combinations of the representative embodiments shown within the broad framework of this invention, that may be apparent to those skilled in the art but not explicitly shown or described, should not be construed as precluded.

Figure 1:
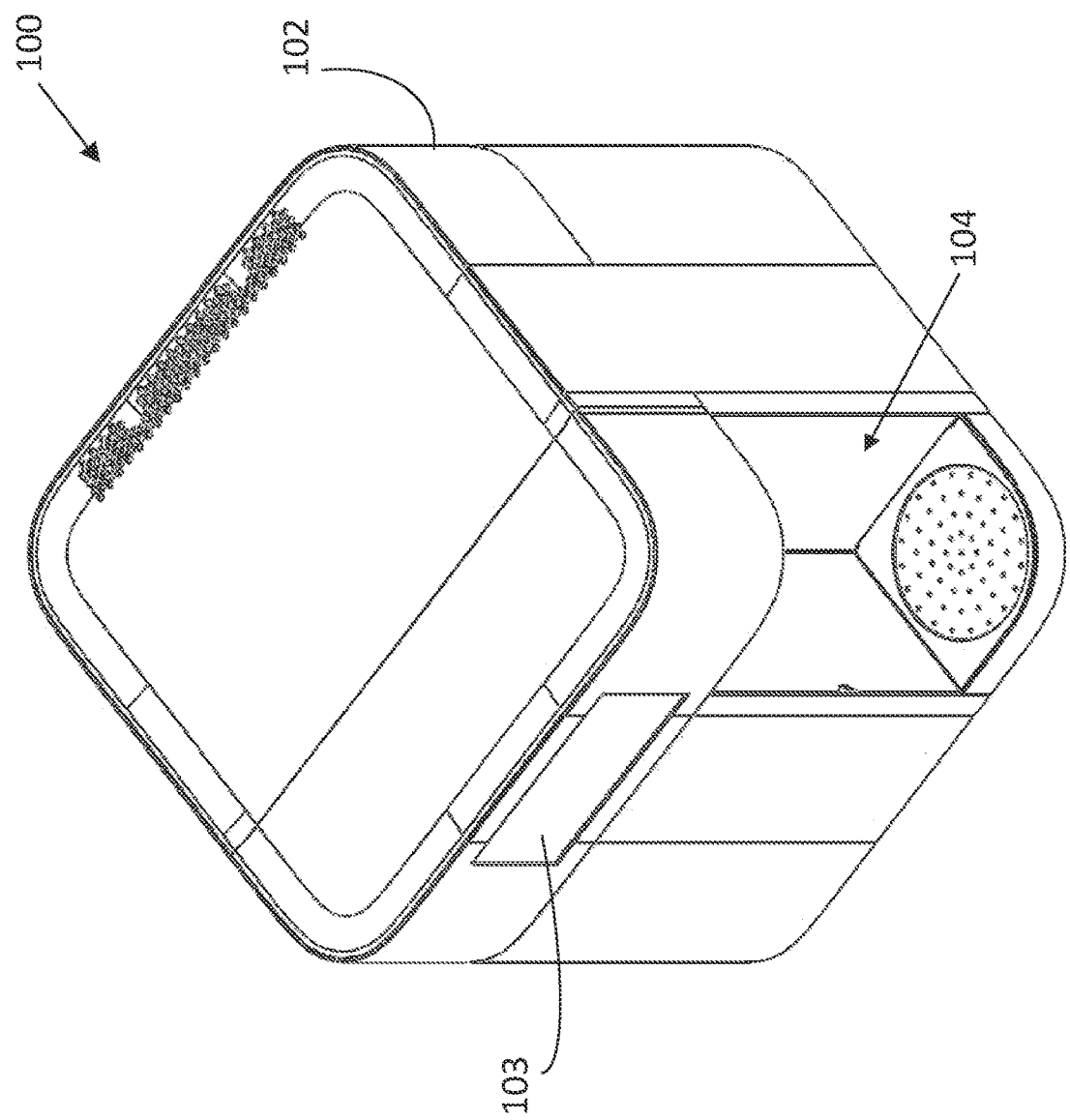
FIG. 1 illustrates an example of a beverage synthesis device, in accordance with specific embodiments disclosed herein.

FIG. 1 illustrates an example of a beverage synthesis device 100, in accordance with specific embodiments disclosed herein. The beverage synthesis device 100 can be any of the fluid mixture dispensing devices described in U.S. Provisional Patent Application No. 63/146,461 filed Feb. 5, 2021 and U.S. patent application Ser. No. 17/547,081 filed Dec. 9, 2021, both of which are incorporated by reference herein in their entirety for all purposes.

The beverage synthesis device 100 can include a casing, such as casing 102, that can house various internal components of the device. The internal components can include any of the components described for any of the devices in in U.S. Provisional Patent Application No. 63/146,461 filed Feb. 5, 2021 and U.S. patent application Ser. No. 17/547,081 filed Dec. 9, 2021. For example, the internal components can include one or more ingredient reservoirs. The ingredient reservoirs can be any of the ingredient reservoirs described in U.S. Provisional Patent Application No. 63/146,461 filed Feb. 5, 2021, U.S. patent application Ser. No. 17/547,081 filed Dec. 9, 2021, and U.S. patent application Ser. No. 17/545,699 filed Dec. 8, 2021, all of which are incorporated by reference herein in their entirety for all purposes. As another example, the internal components can include one or more cartridges for the ingredient reservoirs. The cartridges can be any of the cartridges described in U.S. Provisional Patent Application No. 63/146,461 filed Feb. 5, 2021, U.S. patent application Ser. No. 17/547,081 filed Dec. 9, 2021, U.S. patent application Ser. No. 17/547,612 filed Dec. 10, 2021, and U.S. patent application Ser. No. 17/545,699 filed Dec. 8, 2021, all of which are incorporated by reference herein in their entirety for all purposes. As another example, the internal components can include one or more solvent reservoirs. The solvent reservoirs can be any of the solvent reservoirs described in U.S. Provisional Patent Application No. 63/146,461 filed Feb. 5, 2021 and U.S. patent application Ser. No. 17/547,081 filed Dec. 9, 2021, both of which are incorporated by reference herein in their entirety for all purposes.

A beverage synthesis device such as device 100 can therefore be adapted to synthesize a beverage using one or more ingredients from the ingredient reservoirs and/or one or more solvents from the solvent reservoirs. The beverages can be synthesized based on recipes for the beverages. The recipes can be in a library of recipes from which a user can select. The recipes can include the amount of ingredient and other data required for the specific beverage such as the temperature of the beverage, a mixing time, etc. The recipe can be compatible with the beverage synthesis device in that the device can be able to synthesize the beverage from the recipe. For example, the recipe can be in the form of instructions for a controller in the device 100 or be otherwise translated into instructions for the device. The controller can execute the instructions and actuate corresponding valves, pumps and other components to dispense the required amounts of ingredient(s) and/or solvent(s) for the beverage. The valves, pumps and other components can be actuated for a period of time determined by the amount of ingredient to be dispensed. In this way, the recipe can be in terms of the ingredients and amount of ingredients or in terms of actuation of mechanical components, such as which valves to open and for how long. The recipe can be in any other terms as long as it is compatible with the device and the device can therefore synthesize a beverage from it.

The beverage synthesis device can include a user interface, such as user interface 103. The user interface 103 can include any means for outputting information from the device to a user of the device, and for inputting information from the user of the device to the device. In this way, the user interface can include any means that facilitate the interaction of a user of the device with the device, including but not limited to a display, a speaker, a microphone, a camera, various sensors such as light and presence sensors, etc. For example, the user interface can include a touch screen display, so that the device can display information for the user via the display, and the user can provide inputs to the device via the touch screen display. As another example, the interaction between the user and the device can be via auditory cues provided by the device via a speaker and voice commands from the user received via a microphone. As another example, the interaction between the user and the device can be via auditory cues provided by the device via a speaker and voice commands from the user received via a microphone on a smart home device which are then relayed via a software integration to the beverage device system and to the beverage device. As another example, the device can recognize user facial expressions and gestures via cameras and sensors. The user interface components can be associated to the controller of the device so that the controller can administrate the information to be outputted and process the information being received. The user interface can be used by the user for many actions, such as for selecting a beverage from the library of recipes, to be synthesized and dispensed out of the device, for example to a dispense area 104 where a vessel or other container can be placed to receive the beverage.

Figure 2:
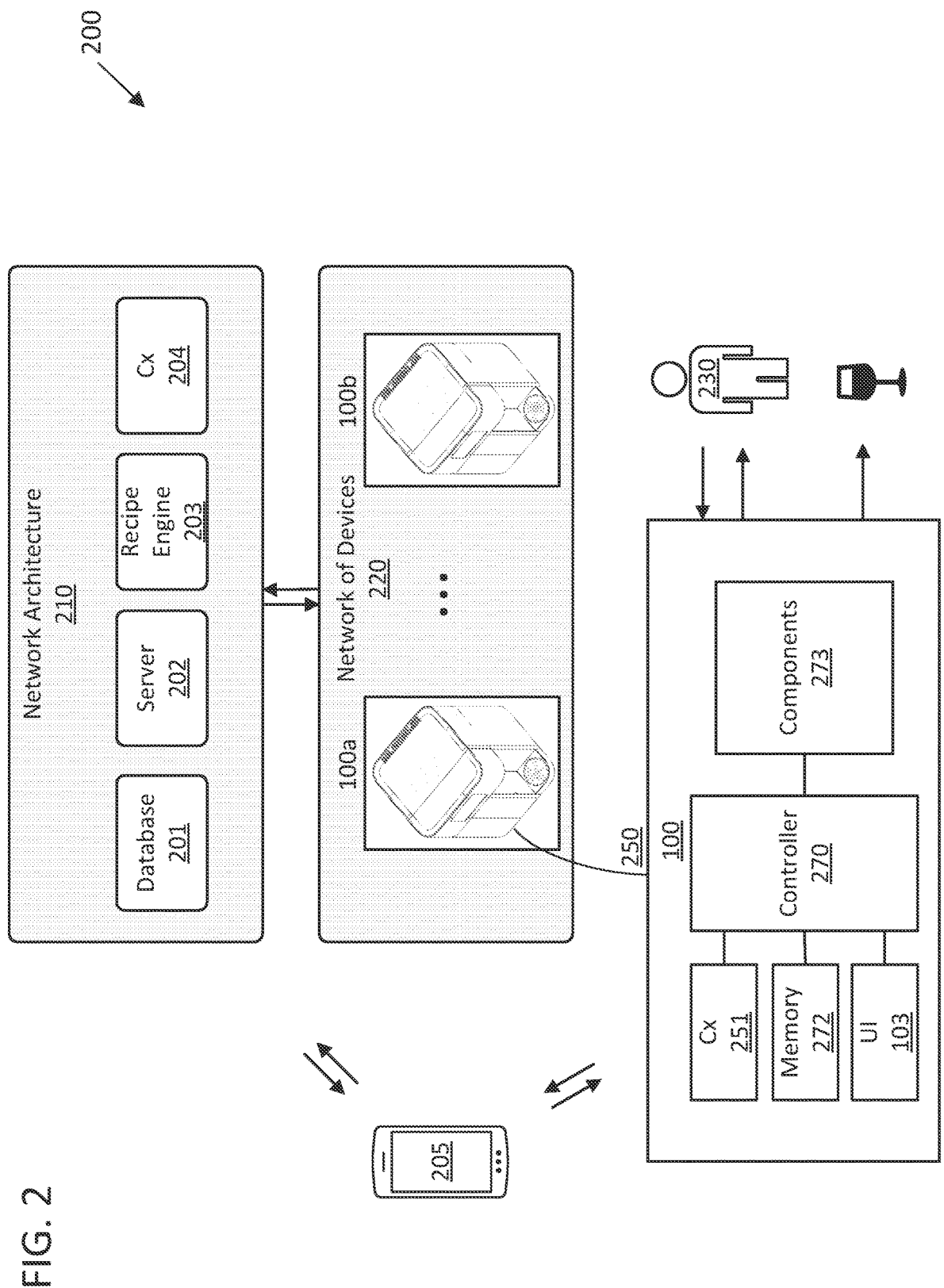
FIG. 2 illustrates a block diagram of a distributed beverage development and improvement platform, in accordance with specific embodiments disclosed herein.

A beverage synthesis device such as device 100 can be part of a network of devices which can comprise any number of devices. The network of devices can be part of or be associated to a platform that can be configured to harvest information from the network of devices and use such information to adjust (e.g., improve) one or more aspects of the platform. FIG. 2 illustrates an example of a platform 200 in accordance with specific embodiments of the invention disclosed herein.

As illustrated in FIG. 2, the platform includes or is associated to a network of devices 220. The network of devices 220 can include multiple devices such as device 100 (exemplary devices 100*a* and 100*b* in the example of FIG. 2 will collectively be referred to as devices 100, and the ellipsis in the middle represents that any other number of devices can be included). The network of devices 220 can be a distributed network. Devices 100 in network 220 can be in geographically different locations and belong to completely different entities (e.g., different users or companies). The devices 100 can be able to communicate through the network 220 (e.g., with other beverage synthesis devices in the network) via communications means as will be described below in more detail. The devices 100 can also be able to communicate outside the network (e.g., with a network architecture 210, the Internet, user devices such as user device 205, and/or other devices out of the network 220) via communications means as will be described below in more detail.

FIG. 2 includes a block diagram 250 of exemplary components of a beverage synthesis device such as device 100. As mentioned before, device 100 can include communications means, such as one or more communication modules 251. The communication means (or communication modules 251) can include any means for transmitting and any means for receiving data. For example, the communication means can include one or more means for wirelessly transmitting and receiving data, such as data transmitted via electromagnetic waves (e.g., radio frequency (RF) signals). This can include any means for wireless communications known to a person skilled in the art of wireless communications, such as but not limited to a wireless receiver, a wireless transmitter and or a wireless transceiver. More specific components can include one or more antennas, one or more codecs, one or more digital to analog (D/A) and/or analog to digital (A/D) converters, one or more data modulators, etc. The communication modules such as communication module 251 can be embedded communication modules of a dedicated technology such as a Bluetooth module, a WiFi module, a Zigbee module, an RFID module, a cellular communications module, etc. As another example, the communication means can include one or more means for non-wireless data communications. For example, the device can include a wired connection to the Internet, or to a device that provides connection to and/or out of the network 220, such as a modem. The communication means can include one or more ports and/or connections in the device 100 such as USB ports, Ethernet ports, etc., for this purpose, and/or that can be directly used to exchange data (e.g., by plugging an Ethernet cable directly to device 100, or a USB WiFi adapter to provide the device with network connection and/or access to the Internet).

The one or more communication modules 251 can allow the devices in network 220 to communicate (e.g., transmit and/or receive data). The one or more communication modules 251 can allow the devices in network 220 to communicate with each other, either directly or through a dedicated network or through a public or private network such as the Internet or a cellular network. The devices can also communicate, via the one or more communication modules 251, with a network architecture, such as network architecture 210. In specific embodiments of the invention, the devices can communicate with each other through the network architecture 210 itself, as will be explained below in more detail. The devices can also communicate, via the one or more communication modules 251, with devices which are not part of the network 220, such as a user device 205. The devices can communicate with such device via Bluetooth, WiFi, a cellular network, or any of the technologies described above, or any other technology such as short-range communications (e.g., Near Field Communications (NFC)).

As illustrated in block diagram 250, the one or more communication modules can be connected to one or more controllers of the device, such as controller 270. In this way, the controller can administrate the data received and/or transmitted via the communication modules 251. The controller can operate in association with one or more memories, such as memory 272. The one or more memories 272 can store instructions to be executed by the one or more controllers 270 so that the controller 270 can perform tasks for the device 100, such as administrating the data received and/or transmitted via communication modules 251. For example, the controller 270 can pull data from memory 272 to be sent to the user device 205, the network architecture 210, and/or another device 100 via the one or more communication modules 251. Similarly, the controller can store received data in memory 272. The controller can additionally or in combination periodically send data or prepare data on the fly for transmission via communication modules 251, such as by using data in memory and/or data entered (via the user interface 103, device 205, etc.) to compute data to be sent out of the device 100. The controller can also administer the information to be outputted and/or inputted via the user interface 103 (introduced with reference to FIG. 1). The controller can also be in communication with and/or control other components 273 of the device. The components 273 can be any other components of the device, for example the electronic, electric and/or mechanical components that enable the device 100 to synthesize and dispense a beverage. The components 273 can include sensors, valves, pumps, subsystems of the device such as a pneumatic system, a dispense system, a cleaning system, etc. The components 273 can be any of the components of any of the fluid mixture dispensing devices described in U.S. Provisional Patent Application No. 63/146,461 filed Feb. 5, 2021 and U.S. patent application Ser. No. 17/547,081 filed Dec. 9, 2021.

Each of the devices 100 in network 220 can be equipped to perform its functions (e.g., synthesize and dispense a beverage) individually without being connected to the network 220 and/or associated to platform 200. For example, the devices can include a library of recipes stored locally in memory for a set of beverages to be synthesized by the device (e.g., how much of each ingredient should be mixed together for a given beverage, what is the temperature of the beverage, etc.). Each device can likewise include instructions stored in memory for the device to synthesize and dispense such recipe (e.g., which valves to open and how much time should they be open for the ingredients to be dispensed according to the recipe, etc.). A user of the device, such as user 230, can operate the device via the user interface 103 and/or a user device 205 (e.g., to select the recipes, to personalize such recipes, to program the device, etc.) and the device 100 can be able to conduct such functions by executing instructions in memory. In this way, each of the devices 100 in network 220 can be administered individually (for example a user of each device can administrate the device via de user interface 103 or a user device, such as user device 205) regardless of any network access.

In specific embodiments of the invention, however, it can be advantageous to provide a device which can operate in association with a platform such as platform 200, from both a user perspective and a device manufacturer perspective. Platform 200 can include or be associated with additional resources that can make the experience of using device 100 richer and more appealing to the users, while at the same time contributing to an organic development of the platform and overall improvement of the features offered.

The platform 200 can include or be associated to a network architecture, such as network architecture 210. Network architecture 210 can include resources (e.g., hardware and/or software) that can augment the functionalities of the platform and/or the devices 100 in network 220. In specific embodiments of the invention, the network architecture 210 can administrate one or more functions for the devices 100. For example, network architecture 210 can administrate communication among network of devices 220, can store data for the network of devices (for example user data, recipes, instructions to be executed by the devices, etc.), can provide system's updates, can connect the devices to other systems and/or services such as repair systems, ingredients supply systems, cleaning systems, etc. As another example, the network architecture can run one or more checks for the devices. For example, the network architecture can issue a remote command to conduct a validation check on the device (e.g., hardware and/or software checks). In this way, the network architecture can verify the status of one or more components and/or the system operating in the device. The verification can be a system's operation quality check to detect if the device is operating properly, such as by checking to see if certain operational parameters of the device are out of acceptable thresholds, etc.

The network architecture 210 can be a physical network architecture, a virtual network architecture or a combination of both. In specific embodiment of the invention, the network architecture 210 is a cloud network architecture. The network architecture can be proprietary to the platform 200 or be implemented in a public network such as a cloud computing provider's hosting service or any other service. The network architecture 210 can include any number of resources to enable various functionalities to the platform. For example, the network architecture can include storage and processing power for the network of devices, as will be explained below in more detail.

In specific embodiments of the invention, the network architecture 210 can include the communication channels and resources that enable communication between the network of devices 220 and/or with the network architecture 210, such as routers, getaways, etc. In specific embodiments of the invention, the network resources (hardware and/or required software to interconnect the devices 100) in network of devices 220 is provided by the network architecture 210 itself, and the network of devices 220 can be part of the network architecture 210.

The network architecture can include one or more databases, such as database 201. The databases can store any kind of data associated to the platform 200. The databases can provide storage for the network of devices 220. For example, database 201 can be a user's data database, and store information about the users of the devices 100, such as user profiles, user preferences, user platform history, user payment history, etc. The database 201 can be a recipes database, and store recipes to be accessed by the network of devices 220, such as one or more library of recipes. The database 201 can be an instructions database, and store instructions to be executed by the network of devices to perform certain functions. The database 201 can be a system's database, and store data related to the system's operational parameters, updates and performance.

The network architecture can include one or more servers, such as server 202. The servers can run any kind of services for the platform 200. For example, the servers can administrate communication between the devices in network of devices 220 and/or with the rest of network architecture 210. The servers can provide an interface between the network of devices 220 and the rest of the resources in network architecture 210, such as an interface between the network of devices 220 and database 201. The servers can also provide interfaces between the platform 200 and external platforms or services, for example the servers can implement Application Programming Interfaces (API) to pull data from other platforms such as external recipe libraries (e.g., a recipe in a website or social media platform can be pulled to the platform 200 and translated into a recipe compatible with the network of devices).

The network architecture 210 can instantiate one or more services for the network of devices 220, such as a recipe engine 203. The recipe engine can be instantiated by a server such as server 202 or be a different hardware module with processing elements and access to data to conduct these functions. The recipe engine 203 can create recipes for the network of devices 220, update existing recipes (e.g., based on user's input, based on new data in the platform, based on availability of ingredients, based on a user's profile (e.g., vegan), etc.). Recipe engine 203 can include artificial intelligence (e.g., can implement an embedding and recommendation engine) to create recipes based on data from the Internet, based on user's preferences and personalization, based on new ingredients available, based on instructions or proposed variation from a beverage creator (company, team, laboratory, individual or A/B/C/ . . . variation testing algorithm) and/or based on any data received from the network of devices, as will be explained below in more detail.

The network architecture 210 can also include communication means such as means for transmitting and means for receiving data. The means can include one or more communication modules, such as communication module 204. Communication module 204 can be the same or similar to communication modules 251. The communication modules can serve to communicate with the network of devices 220, to communicate different resources within the network architecture itself, and/or to allow communication with other devices and systems. In specific embodiments of the invention, the means for transmitting and the means for receiving information include one or more servers to which the devices 100 have access, and the transmitting and receiving take place by accessing the server(s). In this way, the network architecture can be said to be transmitting information when the devices are accessing information therefrom, and receiving information, when the devices are sending information thereto. A user device, such as user device 205, can be able to communicate with the network architecture via the communication means 204, and therefore transmit data to and receive data from both the network architecture and the device 100.

In specific embodiments of the invention, the platform 200 can include or otherwise be associated with the network of devices (e.g., 220) and the network architecture (e.g., 210) to administrate functions of the platform. As explained before in this disclosure, the network 220 can be distributed network. The network architecture can likewise be a distributed network architecture. The platform 200 can likewise be a distributed platform. The various resources can be administered by centralized and/or distributed controllers so that the platform performs the various functions smoothly regardless of the distribution of resources necessaries for the given function. In specific embodiments of the invention, the platform can include a hierarchy of controllers so that various resources can be controlled separately and still respond to a higher-level set of controllers.

In specific embodiments of the invention, the platform can be used for distributing and collecting information to and from the network of devices. For example, the platform can be used to distribute recipes to the network of devices. The platform can also be used to allow the devices in the network to share content, for example data from one device (e.g., user data, personalization of a recipe, a recipe created by one user) can be made accessible to other devices in the network by either accessing this data directly through the network of devices or though the network architecture.

Figure 3:
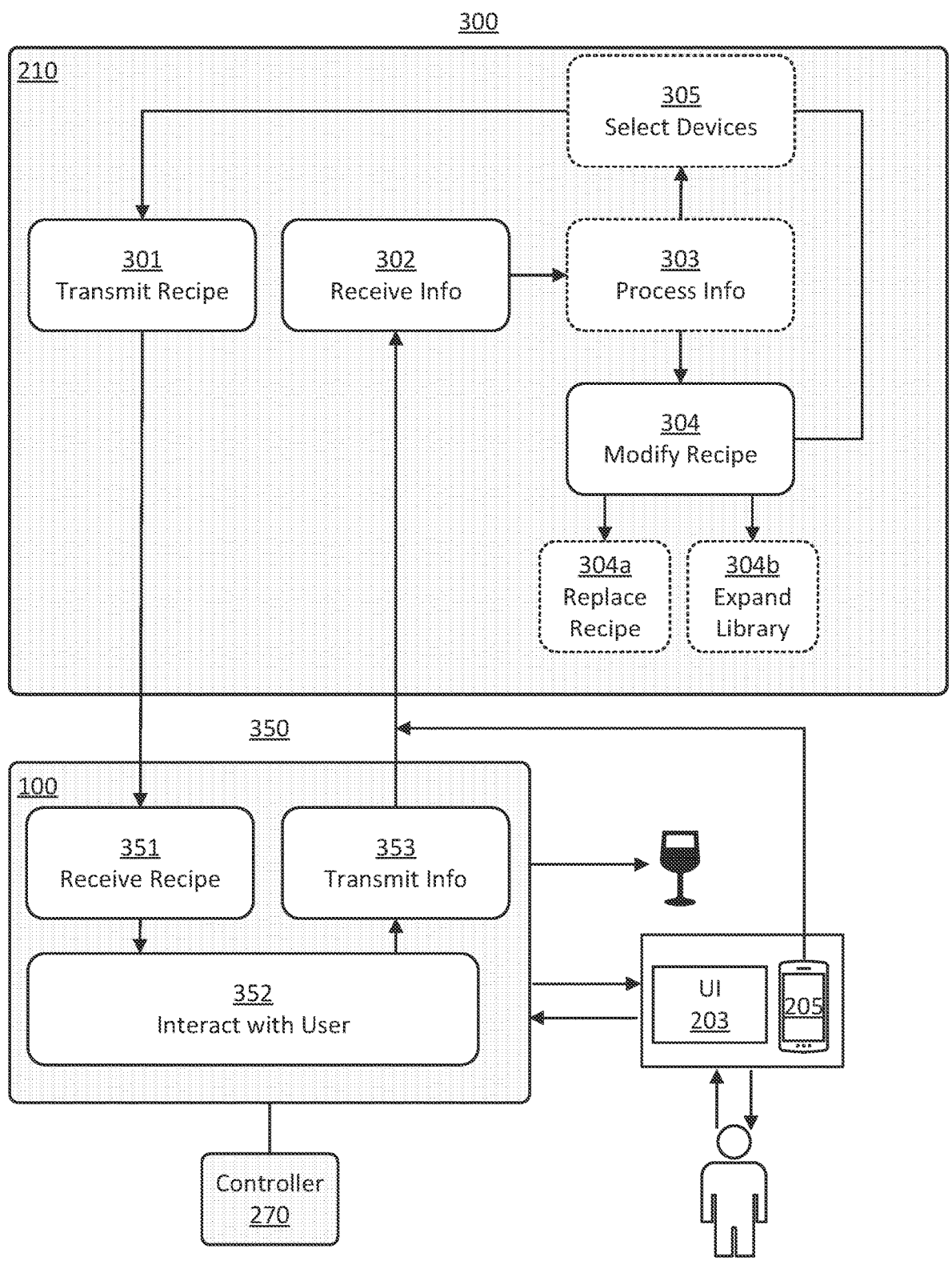
FIG. 3 illustrates a flowchart for a set of methods for the distributed beverage development and improvement platform, in accordance with specific embodiments disclosed herein.

In specific embodiments of the invention, platform 200 can be used as a beverage development and/or improvement platform. FIG. 3 illustrates a flowchart for a set of methods for a distributed beverage development and improvement platform, in accordance with specific embodiments disclosed herein. The methods can be for distributing recipes, for developing recipes, for improving recipes, and/or for collecting information regarding recipes, using a platform such as platform 200. FIG. 3 includes a first flowchart 300 for a set of methods to be performed by a network architecture, such as network architecture 210, and a second flowchart 350 for a set of methods to be performed by at least one device 100 in the network of devices 220. In specific embodiments of the invention, the methods are performed using a network of devices which includes more than one device, e.g., at least two devices and up to any number of devices in the network of devices.

Flowchart 300 starts with a step 301 of transmitting, from the network architecture 210, a recipe to one or more beverage synthesis devices 100 in a network of beverage synthesis devices such as network 220. The recipe can be a recipe compatible with the network of beverage synthesis devices for synthesis into a beverage. The recipe can be in the form of instructions to be executed by the beverage synthesis devices. The recipe can be a recipe from a recipe database of the platform 200 such as database 201, a recipe from an external source pulled to the platform 200 for example via a server such as server 202, a recipe uploaded to the network architecture 210 (for example uploaded by one of the devices 100 in the network, by a user device, by a network administrator, etc.), and/or a recipe developed by the platform 200 itself such as by using a recipe engine such as recipe engine 203.

The network architecture 210 can transmit such recipe via the one or more communication modules 204. Alternatively, or in combination, the network architecture 210 can transmit such recipe by making the recipe available to the devices 100 in network 220. For example, server 202 can be a server to which devices 100 have access via an Internet connection, and the devices can therefore access recipes by contacting the server on demand. Therefore, the step 301 does not necessarily involve active transmission of data from the network architecture to the devices but the process of making such data (in this case the recipe) available to the devices.

As illustrated in flowchart 350, the recipe can be received by the one or more devices 100 in a step 351. The recipe can be received via any of the means for receiving data disclosed before in this disclosure with regard to communication module 251. The device can use the recipe when received in various ways, for example the device can store the recipe in a local memory (e.g., update a local library of recipes), synthesize a beverage based on the recipe, recommend such beverage to a user via the user interface 103 or mobile device 205, etc. The device can synthesize a beverage from such recipe when received from the network architecture or store such recipe locally, for example in a local memory such as memory 272, for future use. The device can alternatively, or in combination, access the recipe remotely from the network architecture as needed. For example, the device can access the library of recipes in the network architecture for the user to make a selection and pull the recipe from the network architecture in response to the user selection. Therefore, step 351 of receiving the recipe does not necessarily involve active reception of data by the devices but the process of accessing such data (in this case the recipe) by the devices.

As indicated by step 352 in flowchart 350, the device 100 can interact with a user in its normal course of operation. This interaction can include receiving inputs from a user (for example via user interface 103 and/or user device 205), synthesizing and dispensing beverages to the user as required, etc. This interaction can be administered by a controller such as controller 270 which can process user inputs and convert them into controls for the device. For example, the controller can receive a user's selection of a beverage on a display of the device and actuate mechanical components of the device to synthesize and dispense such beverage.

Flowchart 350 also includes a step 353 of transmitting information to the network architecture. The information can be transmitted via any of the means for transmitting disclosed before in this disclosure with reference to communication module 251. The information can be information stored in memory in the device 100 or information sent dynamically from the controller or other components of the device in response to events such as the pouring of a beverage. In specific embodiments of the invention, the information can be sent, alternatively or in combination, from a user device such as device 205 working in association with the device 100.

The information can include any information available to the one or more devices 100. In specific embodiments of the invention, the information can include user data such as user profiles and user data entered on the devices 100. In specific embodiments of the invention, the information can include device data such as data related to the operation of device 100 (e.g., performance, status of components, etc.). In specific embodiments of the invention the information includes usage information from the network of beverage synthesis devices. The usage information can include any information about how the devices 100 are being used. For example, the information can include information about the beverages being dispensed such as what beverage was dispensed, by which user/device, at what date and/or time, geographic location of the device, ambient temperature outside of the device, what customizations were made to the beverage, etc. Various measurements of the dispensed beverages could be taken such as by a visible light camera and other sensors. The information can also include derivatives of the usage data such as the frequency with which a device is used, the date and/or times at which the devices are used and for what kind of beverages, the types of beverages being dispensed and quantity of beverages that are dispensed (for example how many times the same beverage was dispensed by the same user), the frequency of consumption and changes in frequency of consumption of a beverage, the consumption of substitutes, indications that user(s) ordered more than one of a given beverage, indications that the user ordered a beverage once and did not order it again even when recommended by the device, etc. The usage information could also be provided in response to the explicit harvesting of preference data (e.g., responses to surveys transmitted to a device 205 or displayed on a user interface 103). The explicit harvesting of data could include asking a user to rank their satisfaction with a given beverage or to provide other data regarding the overall organoleptic experience provided by the beverage (color, flavor profile, smell, etc.).

In specific embodiments of the invention, the information includes pure usage data sent by the device 100 from which more information can be derived. For example, the information transmitted can be an indication of an event such as that a certain beverage was poured. This data can then be used by the network architecture to derive more information such as how many pours of the same beverage have occurred in the last month for a specific device, or if a user repeated a beverage (which could indicate that the user liked it) or did not repeat the beverage (which can indicate the user did not like it). The derivatives of the data can be derived by the network architecture once the information is received or by the device 100 itself before transmitting the information to the network architecture. The information can therefore include pure usage data and/or derivatives thereof.

In specific embodiments of the invention, the devices 100 can be programmed to recommend beverages to the users. For example, the beverage for the recipe transmitted in step 301 can be recommended to a user via the user interface 103. This can be advantageous for example when a new recipe is being added to the library of recipes, because the user can be informed of the recipe by the recommendation. In those embodiments, the usage information can indicate how often the one or more beverage synthesis devices are used to dispense a beverage (e.g., a new beverage) when the beverage is recommended.

In specific embodiments of the invention, the information can relate to the synthesis of the beverage associated with the recipe transmitted in step 301, by the one or more beverage synthesis devices. In specific embodiments of the invention the information includes a frequency of synthesis of the beverage by the one or more beverage synthesis devices. In specific embodiments of the invention, the information includes customizations to the recipe, for example entered in one or more of the devices 100. This can be advantageous in that the recipe transmitted in step 301 can be a first, original, old and/or default recipe which can be selected by a user, and the frequency at which the beverage was dispensed can be indicative of acceptance of the recipe. The customizations, on the other hand, can be indicative of adjustments that the recipe may need. For example, if the information indicates that most users add more sugar to the beverage, this can indicate that recipe needs to be adjusted to include a higher concentration of sugar by default.

The information transmitted by the device 100 to the network architecture can therefore relate to the user's actual interactions with the device and characterize a profile of the users and/or the respective devices. In specific embodiments of the invention, the information includes information collected from overt feedback given by the users (e.g., hitting a like button, or providing a 1 to n star scale rating on the device 100 and/or the user device 205, sharing recipe on social media, providing reviews, etc.). However, in specific embodiments of the invention most of the information transmitted can be information naturally derived from the normal use of the various devices 100. When the network of devices includes more than one, such as at least two or more or at least 100 beverage synthesis devices, the information transmitted by the devices can provide useful information as the idiosyncrasies of a particular user can be screened out from the data. For example, a user that tries a new coffee recipe and then does not try it again for an extended period of time might not be an indication that the user did not enjoy the recipe as the individual user may have gone on vacation or suddenly decided they wanted to stop drinking coffee altogether. As additional devices in the network can cancel out this kind of noise in the signal between usage data and true consumer preferences, a large network of devices can offer significant benefits. All the information can then be used by the platform to adjust one or more aspects, such as the recipes transmitted in step 301, based on data that characterizes the population who would benefit from those adjustments.

Flowchart 300 continues with a step 302 of receiving, at the network architecture, the information from the one or more beverage synthesis devices. The information can be received by the network architecture via any of the means for receiving information disclosed before. The devices 100 in network 220 can be programmed to periodically send data to the network architecture 210. The information received in step 302 can be used by the network architecture to modify the recipe transmitted in step 301, as indicated by step 304. The recipe transmitted in step 301 can be a default recipe or an old or new version of a beverage. The platform 200 can then be used to modify such recipe based on the information received from the network of devices. For example, the information received in step 302 can include a customization to the recipe entered on one or more beverage synthesis devices, and the modified recipe from step 304 can then include the customization of the recipe. In this way, the recipe can be modified based on user preferences and/or customizations (if users customized the recipe from step 301 by adding more sugar, the recipe can be modified to a modified recipe which includes a larger amount of sugar).

The recipe can be modified based on other numerous factors such as the number of repeat times that the recipe was selected by the same user, the overall consumption of the beverage across the network of devices, the substitutions made of the ingredients of the recipe, feedback provided by users, etc. Any indications that the users liked or did not like the recipe can be used to modify such recipe. For example, if it is determined that the users did not like it (as indicated for example by the number of repeat times that the beverage was dispensed after a first try), the platform can abort the new recipe and modify it so that it is the same or similar to the default recipe or make additional modification to create a new recipe to evaluate the network response. Similarly, any indications of potential modifications to be made can be used by the platform to modify the recipe. For example, if it is determined that most users add lemon to a certain recipe, the recipe can be modified to create a new recipe which already includes lemon in it. These and other modifications can be made leveraging the information received in step 302.

Step 304 can optionally be preceded by or executed in combination with an optional step 303 of processing the information received. In specific embodiments of the invention, step 303 is a sub-step of step 304 in that modifying the recipe could involve processing the information first to determine the modifications to be made. Steps 302 and 304 can be conducted simultaneously with step 302, as information is being received, or subsequently, after the information is received. The information can be processed so that, for example, data from more than one device can be computed, compared, and combined. In this way, data used by the network architecture to modify the recipe in step 304 can be indicative of the general behavior of the network of devices and not of one specific device. As another example, data can be processed to derive more information from the information received, as explained before in this disclosure. Derivatives of the information received, such as how many times a user poured the same beverage, can be determined in this step if not provided by device 100 directly.

As illustrated, flowchart 300 loops back to step 301 of transmitting, from the network architecture, the modified recipe from step 304 to the network of beverage synthesis devices. The modified recipe can likewise be compatible with the network of beverage synthesis devices for synthesis into a modified beverage. The method can therefore include iteratively repeating the transmitting step 301, the receiving step 302, and the modifying step 304 with additional modified beverages. In specific embodiments of the invention, this can be advantageous in that the beverage can be adjusted multiple times to obtain an optimized recipe. The information from the network of beverage synthesis devices can then be used as intrinsic feedback to determine a network response to the recipe and continue to adjust the recipe, and/or develop new recipes.

In specific embodiments of the invention, the modified recipe can be used to replace the default or previous recipe, as indicated by optional step 304*a*. This can include replacing the previous version from any library of recipes (either stored locally in the devices 100 or in a database of the network architecture such as database 201). In specific embodiments of the invention, the modified recipe can be used to expand the existing library of recipes (either stored locally in the devices 100 or in a database of the network architecture such as database 201), as indicated by optional step 304*b*. In those embodiments, both the previous and the modified recipe can be accessible in the library of recipes. This can be advantageous, for example, in the development of new recipes, the testing of new flavors, etc.

Flowchart 300 also includes an optional step 305 of selecting the one or more devices to which the recipe is to be transmitted in step 301. As illustrated, this step can be performed based on information received in step 302 and/or processed in step 303. For example, if the information received is usage information from the devices, the selection of the devices can be made based on such usage information. In this way, the platform can be used to transmit new recipes to target devices. For example, usage information can indicate how often the devices are used to dispense a new beverage when the new beverage is recommended or added to the library of recipes. The platform can then select devices that are prone to selecting the new beverage (to be transmitted in step 301) based on such information. This can be advantageous for running beverage tests in the platform for which not all users would be likely to participate. Steps 303-305 can all be performed by processors in the network architecture executing instructions stored in memory. The steps can be executed by one or more servers, such as server 202.

In specific embodiment of the invention, a platform such as platform 200 provides significant benefits in that it can allow for the development and improvement of recipes based on intrinsic user feedback and genuine behavior instead of responses to explicit prompts for feedback. Usage data which would otherwise not be used for this purpose can be used to determine the response to the recipes and iteratively adjust such recipes. Furthermore, the data can potentially be a more accurate gauge of user sentiment because it short circuits a user's reasoning regarding the experience and goes straight to what matters, a change in the recipe lead to an increased consumption of the recipe. In specific embodiments of the invention, a platform such as platform 200 can also be advantageous in that statistical sampling from a large number of devices can allow for accurate predictions of the overall consumption either on the platform or through sales of beverages off that platform. When the network of devices 220 comprises a large number of devices, the response of such network can be considered to be a sample of a larger population and used to estimate the profile of the population. This information can be helpful not only for in-platform development but also for vendors outside the platform that target the same population and use the platform to develop beverages to be sold off the platform (e.g., in stores or vending machines).

A platform such as platform 200 and the data mined from the platform can be used in many different scenarios. The data mined and determinations made regarding adjustments to recipes according to the network responses can have a considerable commercial value to vendors off platform because they can characterize groups of users such as users from a specific region, a specific age, etc. The data mined can also be used for behavior predictions not only of users of the platform but also off-platform users. The high volume of data that can be mined, for example if many devices are part of the network, can be statistically important for predicting behavior of a larger group of users even if those users are not in the platform. For example, from the data mined by platform 200 from platform users of a particular age group or location, the preferences of the general population of that particular age group or location can be discerned.

Figure 4:
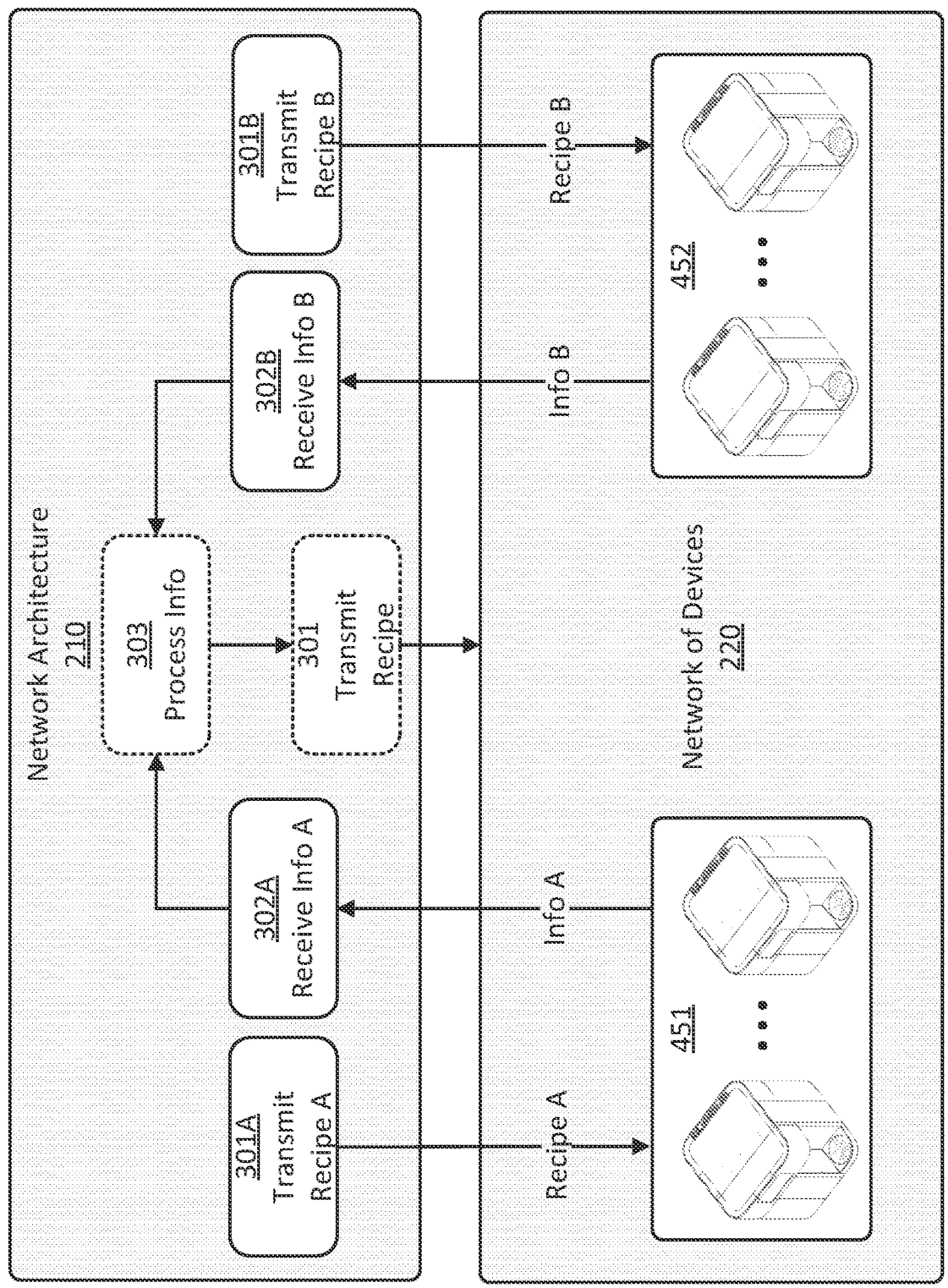
FIG. 4 illustrates a block diagram of an example of the use of the distributed beverage development and improvement platform, in accordance with specific embodiments disclosed herein.

In specific embodiments of the invention, a platform such as platform 200 can be used to conduct tests on variant of a recipe, for example AM testing in which the response to two different variants of a recipe can be evaluated. FIG. 4 illustrates a block diagram and flowchart 400 of an example of the use of the distributed beverage development and improvement platform, in accordance with specific embodiments disclosed herein.

The flowchart includes steps 301A and 301B of transmitting a recipe from the network architecture 210 to the network of devices 220. Steps 301A and 301B can be executed in the same way as step 301 described with reference to FIG. 3. However, in step 301A a first recipe "A" is transmitted to a first set 451 of one or more devices 100 in the network 220, while in step 301B, an alternative recipe "B" is transmitted to an alternative set 452 of one or more devices 100 in network 220. The recipes can be compatible with the network of devices for synthesis into a beverage "A" and an alternative beverage "B". Each of the sets 451 and 452 can include any number of devices. In specific embodiments of the invention, each subset includes at least two devices. In specific embodiments of the invention, each subset includes at least 100 devices.

The devices 100 in each subset can operate in accordance with the flowchart 350 described with reference to FIG. 3 and transmit information to the network architecture 210. As illustrated in FIG. 4, the network architecture can receive the information in a step 302A and a step 302B. Steps 302A and 302B can be executed in the same way as step 302 described with reference to FIG. 3. However, in step 302A an information "A" is transmitted from the first set 451 of one or more devices 100 in the network 220, while in step 302B, an alternative information "B" is transmitted from the alternative set 452 of one or more devices 100 in network 220. Information "A" and information "B" can be collectively used to refer to the individual information received from each device in each respective subset.

The platform 200 can therefore acquire information from various sets of devices and related to various different recipes. The various recipes (e.g., recipe A and B) can be alternative versions of a same recipe to be tested by the platform. Information A and B can be indicative of the response of the platform to each version of the recipe as taken from the natural usage of the devices 100, as explained before in this disclosure. This information can be used by the platform for numerous purposes such as to decide which recipe should be the new version of the recipe. For example, the modifying step 304 described with reference to FIG. 3 could include replacing one of the recipes A or B with the other, based on the information received. The information can be at least indirectly indicative of the synthesis of each version of the recipe by the corresponding set 452. For example, the information A can be related to an amount of synthesis of the beverage by the one or more beverage synthesis devices in set 451, while the alternative information B can be related to an amount of synthesis of the alternative version of the beverage by one or more alternative beverage synthesis devices in set 452. The information can be used to determine which recipe had a better response, for example by determining which recipe was synthesized the most (or by following any other criteria as established by a platform administrator). If it is determined that the recipe B had a better response than recipe A, the modified beverage would be the alternative beverage obtained from the synthesis of recipe B. The process can then continue with different modifications of recipe B sent to the same or different populations as the recipe is iteratively improved.

The method can optionally include additional steps. For example, the method can include an optional step 301 of transmitting the recipe to the network of devices. This step can be step 301 described with reference to FIG. 3 and include the transmission of the recipe to the whole network of devices. For example, after the information is received from the various sets of one or more devices (such as information A from set 451 and information B from set 452) a determination can be made as to which set/recipe had a better response. The platform can then be used to distribute such recipe to the network (or remove one or more variations tested from the network) after the testing phase has ended. The transmitting step 301 can be optionally preceded by a step 303 of processing the information. This step can be the same as step 303 described with reference to FIG. 3 and include an analysis of the data received. During this step, the processing can include computing and comparing the received information to make various determinations, such as to evaluate the responses of the network to the various recipes. This step can be performed by one or more servers of the network architecture, such as server 202.

FIG. 5 illustrates a set of tables with exemplary data used by the distributed beverage development and improvement platform, in accordance with specific embodiments disclosed herein. Each table comprises a first column with a list of devices (devices 1 to n) which can be the number of devices in a network such as network 220. Each table comprises a second column with average consumption data for each device. As illustrated, this example includes data for the last 30 days. The data in the second column can be data determined by each of the devices and transmitted to the network architecture (for example data collected by executing step 352 of flowchart 350 and transmitted during step 353), or data determined by the network architecture (for example from data received in step 302 of flowchart 300 and optionally processed in step 303). As described before in this disclosure, the devices can send information to the network architecture, including usage information. Deriving the information shown in the second column can be done by the devices before transmitting the information (e.g., the devices collect data and send a 30-day report), or by the network architecture (e.g., the devices report every time a beverage is poured and the network architecture keeps a record and count of the total number of pours).

From the second column alone, it is possible to identify a profile of the users/devices in terms of how much the devices are used. For example, device 4A (20 pours) is used considerably more than devices 3A and nA (0 and 3 pours, respectively). The data in the second column can also refer to a single recipe instead of to the overall consumption of the devices. For example, the data in the second column can refer to the consumption of a default, or outdated version of a recipe A. When a new recipe A is released to the network, for example in step 301 of flowchart 300, the data received in step 302 can relate at least in part to that recipe, and a determination as to the consumption of that recipe can be made. The third column in table 501 represents an example of such data. As illustrated, the overall consumption increased, with most devices pouring more beverages than for the average recipe in the second column. This type of data can be used by the platform 200 to determine that the recipe had good acceptance. The modification step can include the modification of the default or outdated recipe with the new one, or a further modification of the new one to further analyze a network's response.

Table 502 illustrates a second example where the overall consumption of a recipe B did not increase and in turn slightly decreased. The average consumption for this network of devices is similar to the one in the example of table 501. In this example, a determination could be made that the recipe B did not have a good response from the network, or at least not as good as recipe A. These and other data can be the information sent by the network of devices and received by the network architecture as described before in this disclosure, use to determine a response of the network to a given change in a recipe.

Tables 501 and 502 were used before to describe two different examples of two different networks of devices receiving a modified recipe, or the same network receiving two different recipes at different times, as described with reference to FIG. 3. However, tables 501 and 502 can also be used as an example of when alternative versions of a same recipe are sent to different groups of devices in the same network, for example for A/B testing purposes, as described in the example of FIG. 4. In this way, devices 1A-1n in table 501 could be a first set of devices in the network of devices to which a version A of the recipe is sent, and devices 1B-nB in table 502 could be a second set of devices in the same network of devices to which an alternative version B of the recipe is sent. Since the average consumption of both groups of devices is fairly even, a comparison of the impact of the new recipe can be made by directly analyzing the change in consumption for the new recipe. In this case, a determination could be made that recipe A has a better response (e.g., increased the usage, or the number of pours in the devices). Recipe A could then be transmitted to the network of devices after the testing phase is complete.

The determination as to what constitute a good or bad response to a recipe can be made based on any criteria as determined by a platform administrator. The example of comparing the amount of synthesis of the beverages was given before for explicative purposes, but any other criteria could be applied, and the servers could likewise compute the information received and determine the recipe to be further passed on to the network.

Tables 503 and 504 illustrate a scenario in which the average consumption of the two groups is not even. As represented, group B in table 504 has a notably smaller consumption rate when compared to group A in table 503. However, the data after the transmitting of the new recipe has a significant impact in both the individual and the overall consumption. Although consumption data for both groups is similar considering the new recipe (third column), a significant change was given in group B in that consumption increased from considerably lower values. Device 1B, for example, with an average consumption of 2 beverages in 30 days, increased consumption to 10 beverages. Device 3B also increased from 1 pour to 5. The platform can be configured to determine not only the numerical changes in consumption or other data, but what those changes mean. A change such as the changes shown in table 504 can be said to be more significant than those in table 503 because the changes are more meaningful for groups of users who do not usually order too many beverages. In this case, the recipe B in table 504 could be said to have had a better response than the recipe A in table 503.

The examples given in FIG. 5 are for explicative purposes only and do not constitute a limitation of the present invention. The information received by the network architecture and used to determine a modification to the recipe can be any kind of information other than a comparison in consumption data. Any number of devices can be part of the network and a network can include any number of sets of devices for different purposes such as testing recipes. The examples in FIG. 5 illustrates how the platform can be configured to process different data differently and consider additional factors such as baseline consumption of the devices to evaluate the network's responses. In this way, the network responses can be evaluated not only as a linear result of the changes in consumption but by adding appropriate weights depending on the type of information received and the impact of such information for the platform.

A controller, as used in this disclosure for example with reference to controller 270, can include one or more processors that can be distributed locally within the system or remotely. For example, one or more components of the system, such as valves, pumps, and sensors can be associated to individual microcontrollers that can control their operations and interaction with other components of the system. In specific embodiments of the invention, the controller can be a control system for the overall device even if the various control elements are separately programmed and are not part of a common control hierarchy. The controller can have access to one or more memories that store the instructions for the controllers. The memories can also store information for the system, such as a library of recipes, reference values such as the pressure thresholds and/or target pressure values mentioned in this disclosure, and any other necessary information such as sensor data and the like.

While the specification has been described in detail with respect to specific embodiments of the invention, it will be appreciated that those skilled in the art, upon attaining an understanding of the foregoing, may readily conceive of alterations to, variations of, and equivalents to these embodiments. Any of the method disclosed herein can be executed by a processor in combination with a computer readable media storing instructions for the methods in combination with the other hardware elements described above. The examples given in this disclosure refer to a platform for development and improvement of recipes. However, a platform as described herein can be used for many other purposes such as for the adjustment of any parameter based on the responses of the network to a given input. These and other modifications and variations to the present invention may be practiced by those skilled in the art, without departing from the scope of the present invention, which is more particularly set forth in the appended claims.

What is claimed is:

1. A method for testing and developing recipes using a network of beverage synthesis devices, the method comprising:
   transmitting, from a network architecture, (i) a recipe to a first set of at least two beverage synthesis devices in the network of beverage synthesis devices, wherein the recipe is compatible with the network of beverage synthesis devices for synthesis into a beverage, and (ii) an alternative recipe to a second set of at least two beverage synthesis devices in the network of beverage synthesis devices, wherein the alternative recipe is compatible with the network of beverage synthesis devices for synthesis into an alternative version of the beverage;
   receiving, at the network architecture, (i) from the first set of at least two beverage synthesis devices, a first usage information about beverage synthesis using the recipe and (ii) from the second set of at least two beverage synthesis devices, a second usage information about beverage synthesis using the alternative recipe;
   comparing, using the network architecture, the first usage information and the second usage information to determine which one of the recipe and the alternative recipe has a better response;
   modifying, using the network architecture and subsequent to comparing the first usage information and the second usage information and determining that the alternative recipe has a better response, the recipe to produce a modified recipe; and
   transmitting, from the network architecture and subsequent to modifying the recipe, (i) the modified recipe to a third set of at least two beverage synthesis devices in the network of beverage synthesis devices and (ii) the alternative recipe to a fourth set of at least two alternative beverage synthesis devices in the network of beverage synthesis devices.

2. The method of claim 1, further comprising:
   iteratively repeating the transmitting, receiving, comparing, and modifying steps with additional modified recipes.

3. The method of claim 1, wherein:
   the recipe is a default recipe;
   the first usage information includes a first customization to the recipe entered on the first set of at least two beverage synthesis devices; and
   the modified recipe includes the first customization.

4. The method of claim 3, wherein:
   the modified recipe expands a library of beverages available from the network architecture.

5. The method of claim 3, wherein:
   the modified recipe replaces the default recipe.

6. The method of claim 1, further comprising:
   receiving, at the network architecture, usage information from the network of beverage synthesis devices; and
   selecting, based on the usage information, (i) the first set of at least two beverage synthesis devices from the network of beverage synthesis devices to receive the recipe and (ii) the second set of at least two beverage synthesis devices from the network of beverage synthesis devices to receive the alternative recipe.

7. The method of claim 6, wherein:
the usage information indicates how often the first set of at least two beverage synthesis devices and the second set of at least two beverage synthesis devices are used to dispense a new beverage when the new beverage is recommended.

8. The method of claim 1, further comprising:
receiving, at the network architecture, (i) from the third set of at least two beverage synthesis devices, a third usage information about beverage synthesis using the modified recipe and (ii) from the fourth set of at least two alternative beverage synthesis devices, a fourth usage information about beverage synthesis using the alternative recipe; and
comparing, using the network architecture, the third usage information and the fourth usage information to determine which one of the modified recipe and the alternative recipe has a better response.

9. The method of claim 1, wherein:
the second usage information is an amount of synthesis of the beverage using the alternative recipe by the second set of at least two beverage synthesis devices; and
the first usage information is an amount of synthesis of the beverage using the recipe by the first set of at least two beverage synthesis devices.

10. The method of claim 1, wherein:
the first set of at least two beverage synthesis devices include at least 100 beverage synthesis devices; and
the second set of at least two beverage synthesis devices include at least 100 different beverage synthesis devices.

11. A network architecture for testing and developing recipes using a network of beverage synthesis devices, the network architecture comprising:
at least one server;
a communication module; and
a recipe engine instantiated in the at least one server;
wherein the network architecture is configured to:
transmit, using the communication module, (i) a recipe to a first set of at least two beverage synthesis devices in the network of beverage synthesis devices, wherein the recipe is compatible with the network of beverage synthesis devices for synthesis into a beverage, and (ii) an alternative recipe to a second set of at least two beverage synthesis devices in the network of beverage synthesis devices, wherein the alternative recipe is compatible with the network of beverage synthesis devices for synthesis into an alternative version of the beverage;
receive, using the communication module, (i) from the first set of at least two beverage synthesis devices, a first usage information about beverage synthesis using the recipe and (ii) from the second set of at least two beverage synthesis devices, a second usage information about beverage synthesis using the alternative recipe;
comparing, using the at least one server, the first usage information and the second usage information to determine which one of the recipe and the alternative recipe has a better response,
modify, using the recipe engine and subsequent to comparing the first usage information and the second usage information and determining that the alternative recipe has a better response, the recipe to produce a modified recipe; and
transmit, using the communication module and subsequent to modifying the recipe, (i) the modified recipe to a third set of at least two beverage synthesis devices in the network of beverage synthesis devices and (ii) the alternative recipe to a fourth set of at least two alternative beverage synthesis devices in the network of beverage synthesis devices.

12. The network architecture of claim 11, wherein the network architecture is further configured to:
iteratively repeat the transmitting, receiving, comparing, and modifying with additional modified recipes.

13. The network architecture of claim 11, wherein:
the recipe is a default recipe;
the first usage information includes a first customization to the recipe entered on the first set of at least two beverage synthesis devices; and
the modified recipe includes the first customization.

14. The network architecture of claim 13, wherein:
the modified recipe expands a library of beverages available from the network architecture.

15. The network architecture of claim 13, wherein:
the modified recipe replaces the default recipe.

16. The network architecture of claim 11, wherein the network architecture is further configured to:
receive, at the network architecture, usage information from the network of beverage synthesis devices; and
select, based on the usage information, (i) the first set of at least two beverage synthesis devices from the network of beverage synthesis devices to receive the recipe and (ii) the second set of at least two beverage synthesis devices from the network of beverage synthesis devices to receive the alternative recipe.

17. The network architecture of claim 16, wherein:
the usage information indicates how often the first set of at least two beverage synthesis devices and the second set of at least two beverage synthesis devices are used to dispense a new beverage when the new beverage is recommended.

18. The network architecture of claim 11, wherein the network architecture is further configured to:
receive, at the network architecture, (i) from the third set of at least two beverage synthesis devices, a third usage information about beverage synthesis using the modified recipe and (ii) from the fourth set of at least two alternative beverage synthesis devices, a fourth usage information about beverage synthesis using the alternative recipe; and
compare, using the network architecture, the third usage information and the fourth usage information to determine which one of the modified recipe and the alternative recipe has a better response.

19. The network architecture of claim 11, wherein:
the first set of at least two beverage synthesis devices include at least 100 beverage synthesis devices; and
the second set of at least two beverage synthesis devices include at least 100 different beverage synthesis devices.

20. The network architecture of claim 11, wherein:
the second usage information is an amount of synthesis of the beverage using the alternative recipe by the second set of at least two beverage synthesis devices; and
the first usage information is an amount of synthesis of the beverage using the recipe by the first set of at least two beverage synthesis devices.

21. A platform for testing and developing recipes, the platform comprising:
- a network architecture;
- a network of beverage synthesis devices;
- means for transmitting, from the network architecture, (i) a recipe to a first set of at least two beverage synthesis devices in a network of beverage synthesis devices, wherein the recipe is compatible with the network of beverage synthesis devices for synthesis into a beverage, and (ii) an alternative recipe to a second set of at least two beverage synthesis devices in the network of beverage synthesis devices, wherein the alternative recipe is compatible with the network of beverage synthesis devices for synthesis into an alternative version of the beverage;
- means for receiving, at the network architecture, (i) from the first set of at least two beverage synthesis devices, a first usage information about beverage synthesis using the recipe and (ii) from the second set of at least two beverage synthesis devices, a second usage information about beverage synthesis using the alternative recipe;
- means for comparing, using the network architecture, the first usage information and the second usage information to determine with one of the recipe and the alternative recipe has a better response;
- means for modifying, using the network architecture and subsequent to comparing the first usage information and the second usage information and determining that the alternative recipe has a better response, the recipe to produce a modified recipe; and
- means for transmitting, from the network architecture and subsequent to modifying the recipe, (i) the modified recipe to a third set of at least two beverage synthesis devices in the network of beverage synthesis devices and (ii) the alternative recipe to a fourth set of at least two alternative beverage synthesis devices in the network of beverage synthesis devices.

22. The platform of claim 21, wherein:
the recipe is a default recipe;
the first usage information includes a first customization to the recipe entered on the first set of at least two beverage synthesis devices; and
the modified recipe includes the first customization.

23. The platform of claim 22, wherein:
the modified recipe expands a library of beverages available from the network architecture.

24. The platform of claim 22, wherein:
the modified recipe replaces the default recipe.

* * * * *